United States Patent [19]
Rattunde

[11] Patent Number: 4,631,042
[45] Date of Patent: Dec. 23, 1986

[54] INFINITELY VARIABLE CONE-DISK TRANSMISSION

[75] Inventor: Manfred Rattunde, Bad Homburg, Fed. Rep. of Germany

[73] Assignee: Reimers Getriebe AG, Zug, Switzerland

[21] Appl. No.: 804,382

[22] Filed: Dec. 3, 1985

[30] Foreign Application Priority Data

Dec. 22, 1984 [DE] Fed. Rep. of Germany ....... 3447092

[51] Int. Cl.[4] ............................................ F16H 55/56
[52] U.S. Cl. ........................................ 474/8; 474/242; 474/245
[58] Field of Search ....................... 474/8, 18, 242, 245

[56] References Cited

U.S. PATENT DOCUMENTS

| | | | |
|---|---|---|---|
| 3,016,755 | 1/1962 | Dittrich | 474/8 |
| 3,364,767 | 1/1968 | Bredschneider et al. | 474/242 X |
| 3,407,672 | 10/1968 | Keller | 474/242 |
| 3,451,283 | 6/1969 | Rattunde | 474/18 |
| 3,916,709 | 11/1975 | Steuer et al. | 474/242 |
| 4,344,761 | 8/1982 | Steuer | 474/245 |

FOREIGN PATENT DOCUMENTS

| | | |
|---|---|---|
| 0124322 | 7/1984 | European Pat. Off. |
| 3027834 | 4/1982 | Fed. Rep. of Germany |
| 807446 | 1/1959 | United Kingdom |
| 2035509 | 6/1980 | United Kingdom |

Primary Examiner—James A. Leppink
Assistant Examiner—Frank H. McKenzie, Jr.
Attorney, Agent, or Firm—Frishauf, Holtz, Goodman & Woodward

[57] ABSTRACT

To reduce contact pressure and wear-and-tear on contact surfaces of link elements of an endless chain (9) looped between spherical engagement surfaces of cone disks, the radius of curvature R of the spherical engagement surfaces, at any point of engagement with the contact surfaces of the chain link elements is greater than a theoretical radius of curvature R, which theoretical radius of curvature results when the distances of axial movement of the movable cone disks for any two transmission ratios are equal, within the range of transmission ratio of the cone disk transmission; and in which the radius D of curvature of the contact surfaces of the link elements is greater than half the width of the link elements, measured transversely to the chain when it is looped between the pairs of cone disks.

10 Claims, 5 Drawing Figures

INFINITELY VARIABLE CONE-DISK TRANSMISSION

Reference to related patent, assigned to the assignee of the present application, the disclosure of which is hereby incorporated by reference: U.S. Pat No. 3,451,283, application U.S. Ser. No. 06/285,869 (DE-PS 30 27 834)

Reference to general art textbook publication: "Stufenlos verstellbare mechanische Getriebe" ("Stepless Adjustable Mechanical Transmissions") by F. W. Simonis, 2nd edition, 1959, published by Springer-Verlag, pp. 8 to 10.

The present invention relates to an infinitely variable cone-disk transmission, and more particularly to a transmission system in which the cone disks do not have precisely conical surfaces but, rather, in which the surfaces of the cone disks are bowed or bulged in approximately spherical shape.

BACKGROUND

In the specification, reference will be made to "cone-disk transmissions" since this is the generally used term for infinitely variable transmissions in which disks are movable towards each other to engage a transmission belt or chain therebetween at various and adjustable radial positions. The disks themselves need not be precisely conical, yet the term "cone disk" will be used since they are roughly conical and the term is customary in the field. Thus, "cone disk" is not to be construed in the limiting sense to a mathematical conical surface on the disks, but, rather, a short-term designation.

Cone-disk tranmissions have previously been proposed in which one disk of a pair is fixed on a shaft and the other disk is axially movable with respect thereto. The axial movement can be controlled hydraulically. A belt, but usually a steel-link chain, is looped between two pairs, the steel-link chain being supplied with compression elements extending transversely to the longitudinal direction of the run of the chain, and engaging the respectively facing surfaces of the cone disks for transfer of force between the pairs of cone disks by frictional engagement. Some structures of this type utilize cone disks in which the surfaces of the cone disks are curved, usually part-spherical; the engaging compression elements of the chain likewise are formed with engagement surfaces which are rounded, for example also part-spherical.

The frictional engagement between the cone disks and the compression elements is of high importance in transmissions of this type. The contact point is of particular importance. The operability and lifetime of the transmission is highly dependent on this mutual engagement, particularly in view of heat which is generated, heat transmission and conduction for ventilation, wear and tear on the engaging elements and material fatigue thereof. The torque transmission capability of the transmission system is also highly affected by the frictional considerations, including heat generation and dissipation of the components of the structure.

The spherical shaping of the cone-disk surfaces has the purpose to prevent tracking offset of the connecting chain in drive systems of this type, and specifically an inclined running of the chain. This part-spherical configuration is a simple and effective way, frequently used, in order to compensate for tracking offset of the chain. Other possibilities arise, but the geometric bases which cause tracking offset or tracking errors are effectively avoided in cone disks of such at least part-spherical configuration, which, otherwise, arises in cone disks which have differently shaped surface configurations. While the transmission at one particular transmission ratio may be perfect, as the transmission ratios change, the spherical configuration provides for good resolution of difficulties arising due to tracking offset. The curvature of the surface was developed mathematically by F. W. Simonis—see the referenced publication "Stufenlos verstellbare mechanische Getriebe" ("Stepless Adjustable Mechanical Transmissions") by F. W. Simonis, 2nd edition, 1959, published by Springer-Verlag, pp. 8 to 10.

The cone disks, made in accordance with the referenced and well known mathematical derivation may use steel link chains to connect the pairs of the cone disks. The steel link chains include pressure elements which transfer torque by frictional engagement at their facing end surfaces with the cone disks. These facing end surfaces usually include a circular circumferential line, having a radius which is equal to half of the length of the compression elements—measured transversely to the run of the chain.

The arrangement of the cone disks, as mathematically derived, with chains as described, provides for high specific engagement pressure at the contact points. High torque transmissions of this type may, in operation, but subjected to the formation of grooves on the cone disks; the wear of the chain contact elements is substantial. Formation of grooves in the cone disks increases the surface of the engagement between the pressure elements on the chain, which may result in hydrodynamic slippage, with the well known undesired results thereof; in other words, a continuity or constant value of frictional forces is no longer insured. The spherical configuration or bulging results in an angle of inclination of the cone disks which is less at small engagement radii of the chain with the cone disks than the angle of inclination at a large engagement radius of the chain. Consequently, change in the transmission ratio between the pairs of cone disks while the system is stopped is difficult, or under some conditions even impossible, due to self-locking of the chain against the cone disks. Yet, it is frequently desirable to be able to adjust the transmission ratio while the system is stopped. The straight run of the chain is obtained, which is desirable; it is made possible, however, only by requiring high specific engagement pressure and consequent substantial wear of the cone disks and the compression elements on the chains.

THE INVENTION

It is an object to improve an infinitely variable cone-disk transmission by so shaping the frictional engagement zones or points that the stability of frictional engagement is increased while the specific pressure is decreased, so that the overall wear and tear will be reduced; further, the transmission should be capable of changing transmission ratio while being stopped, and the torque which can be transmitted should be increased due to the formation of improved engagement force relationships between the chain and the cone disks.

Briefly, the radial relationships of the cone disks and of the pressure elements of the chain are changed previously mathematically determined in this manner: The radius of curvature R of the part-spherical engagement surfaces of the cone disks, at any point of engagement with the contact surfaces of the chain link elements, is selected to be greater than a theoretical radius of curvature r. The theoretical radius of curvature r results from an arrangement in which the distances of the axial movement of the movable cone disks are equal within the range of the ratio of transmission. Further, the radius D of curvature of the contact surfaces of the link elements is greater than half the width of the link elements, measured transversely to the major direction or run of the chain, when the chain is looped between pairs of cone disks.

The arrangement has the advantage that the specific pressure at the contact or engagement points between the compression elements of the chain and the cone disks is substantially reduced, without resulting in hydrodynamic slippage of the chain. This permits loading of the transmission with a higher torque transfer than possible with a prior art transmission of essentially similar size, while additionally substantially decreasing wear and tear on the chains and cone disks.

The arrangement has the additional advantage that, over the range of variation of transmission ratio, the contact points at the facing surfaces of the pressure elements against the cone disks move further away from each other so that, as the transmission changes in transmission ratio, in use, practically the entire facing surface will be subjected to engagement force, so that wear and tear will be distributed, in use of the transmission with different transmission ratios, over the entire facing surfaces of the pressure elements on the chain. The chain will be subjected to a small tracking offset. This, however, is slight and is not disadvantageous or damaging to the chain, since chains as customarily used permit some tracking offset without damage thereto.

For manufacturing reasons, it is easiest to make the surfaces of the cone disks, as well as of the compression element, in spherical form, so that a section line will be part of the circumference of the circle. In such arrangements, it is particularly desirable if the radius R of a section line of the cone disks is selected in a range of about twice to four times the previously referred to theoretical radius r. The exact value will depend on the size of the transmission, the torque to be transmitted, and the variation in transmission ratio which is to be obtained.

The radius D of the surface of the compression elements, likewise considered as, in cross section, a part-circle, is preferably in the range of between 1/15 R to 1.25 R, with a particularly desirable and preferred radius of D=about 1/20 R.

The system is capable of transmitting higher energy levels between pairs of cone disks while, additionally, permitting changing of the transmission ratio while the transmission is stopped. This is particular important if one of the pairs of cone disks has the chain located at a short or small radial position. Instabilities due to changes in frictional relationships between the compression element-cone disk friction pairs are effectively avoided.

DRAWINGS

Figure 3:
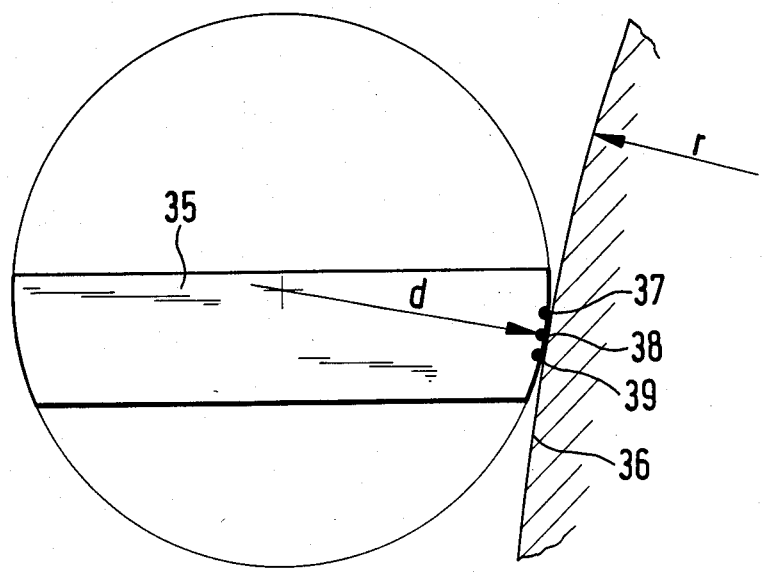
FIG. 3 is a highly enlarged view of the engagement relationships of a chain compression element and a part-spherical cone disk in accordance with the prior art.
Figure 5:
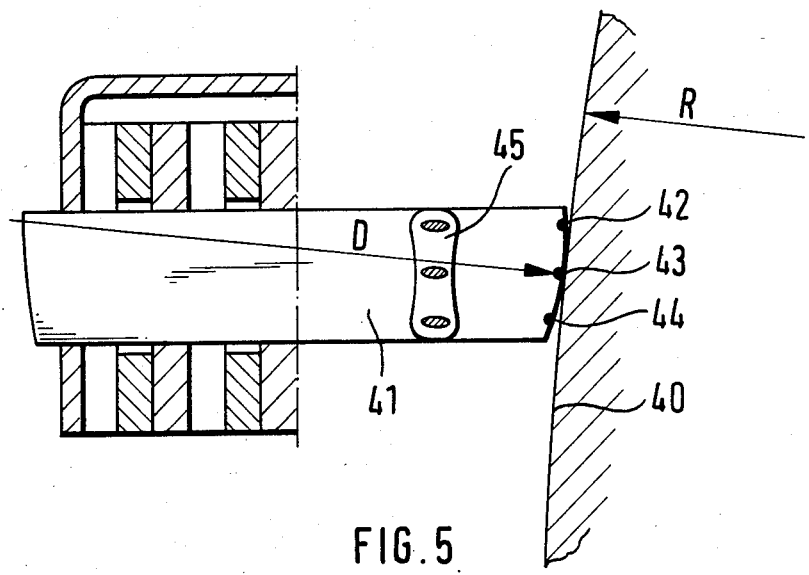
Figure 4:
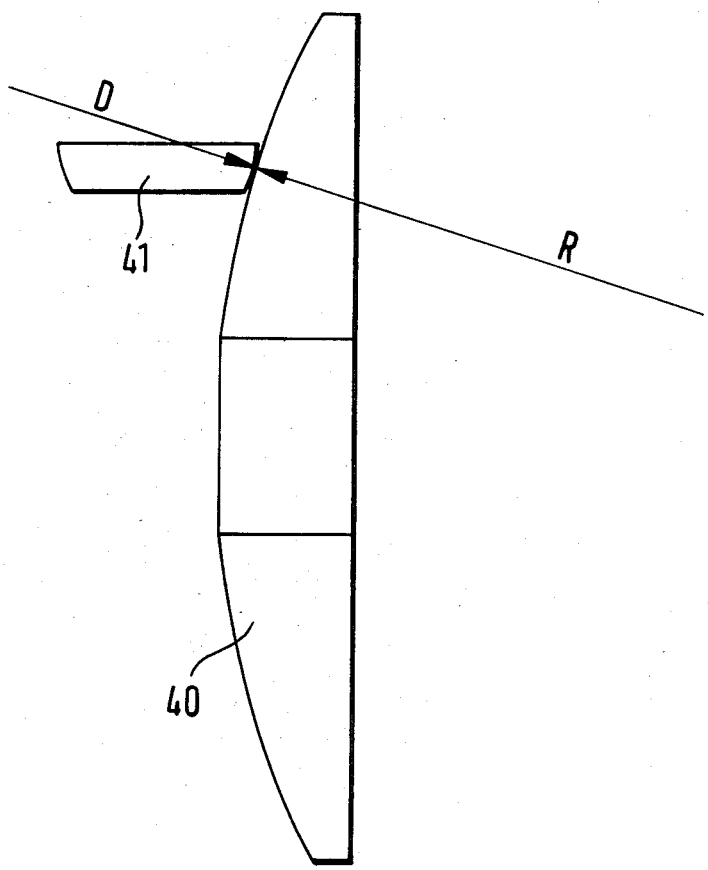

FIG. 4 illustrates, schematically, a cone disk shaped in accordance with the present invention, and its engagement with a compression element in accordance with the present invention; and FIG. 5 is a view similar to FIG. 3, illustrating the engagement relationships in accordance with the present invention, and, also, the link chain connecting parts of cone disks, in fragmentary cross-sectional representation, as well the end face of a compression element in accordance with the present invention.

DETAILED DESCRIPTION

Figure 1:
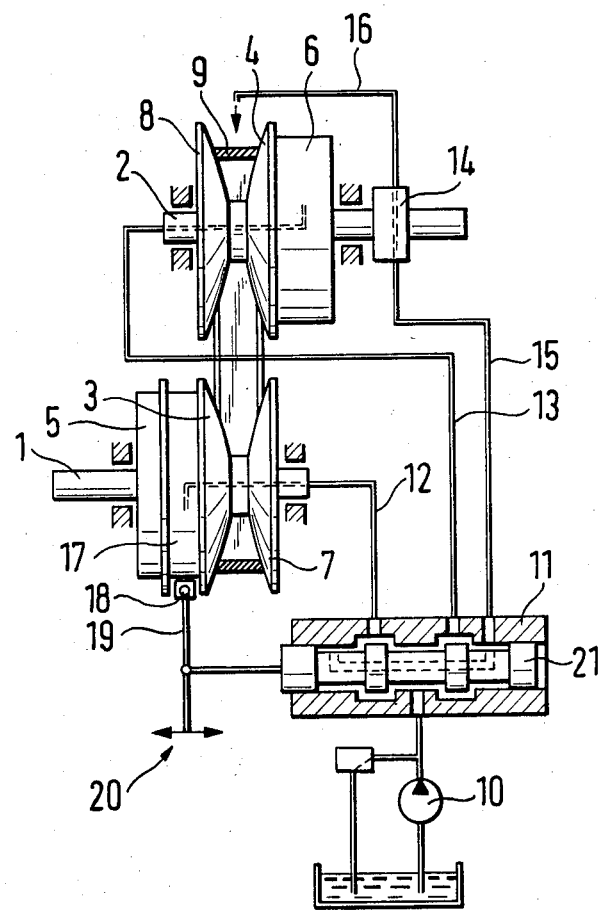
FIG. 1 is a highly schematic illustration of a hydraulically controlled cone-disk transmission, as well known in the prior art.

FIG. 1 illustrates the overall system which is known—see the referenced patent, and will be described only briefly, sufficient for an understanding of the present invention.

A drive shaft 1 has two cone disks located thereon to transmit energy to a driven shaft 2. Cone disks 7, 8 are securely connected to the respective shafts 1, 2. Movable cone disks 3, 4 can be shifted axially along the respective shafts 1, 2, under control of a hydraulic cylinder-piston unit shown schematically at 5 and 6. A steel link chain 9 is looped between the respective pairs 3, 7 and 4, 8 of the cone disks.

The cylinder-piston units 5, 6 are supplied with hydraulic pressure fluid derived from a pump 10 which supplies hydraulic pressure fluid to a four-control edge spool valve 11, having a spool slider 21. Respective control lines 12, 13 supply pressurized hydraulic fluid to the hydraulic units 5, 6. Driven shaft 2 has a torque sensor 14 located thereon which receives, over a line 15, hydraulic drainage fluid, derived from the valve 11. This drainage fluid is throttled in accordance with torque, and controls the pressure within the hydraulic drive unit 5. The pressure fluid, after having been throttled and without any further pressure, is supplied from the torque sensor 14 over a line 16 to lubricate and cool the chain 9.

Cylinder 5 is formed with a circumferential control groove 17 in which a slider 18 engages, coupled to a link 19, which can be controlled manually by a control handle, and moved back and forth as shown by the double arrow 20. The link 19 is coupled to the spool 21 of the spool valve 11.

The operation of the system is well known and reference is made to the referenced patent.

Figure 2:
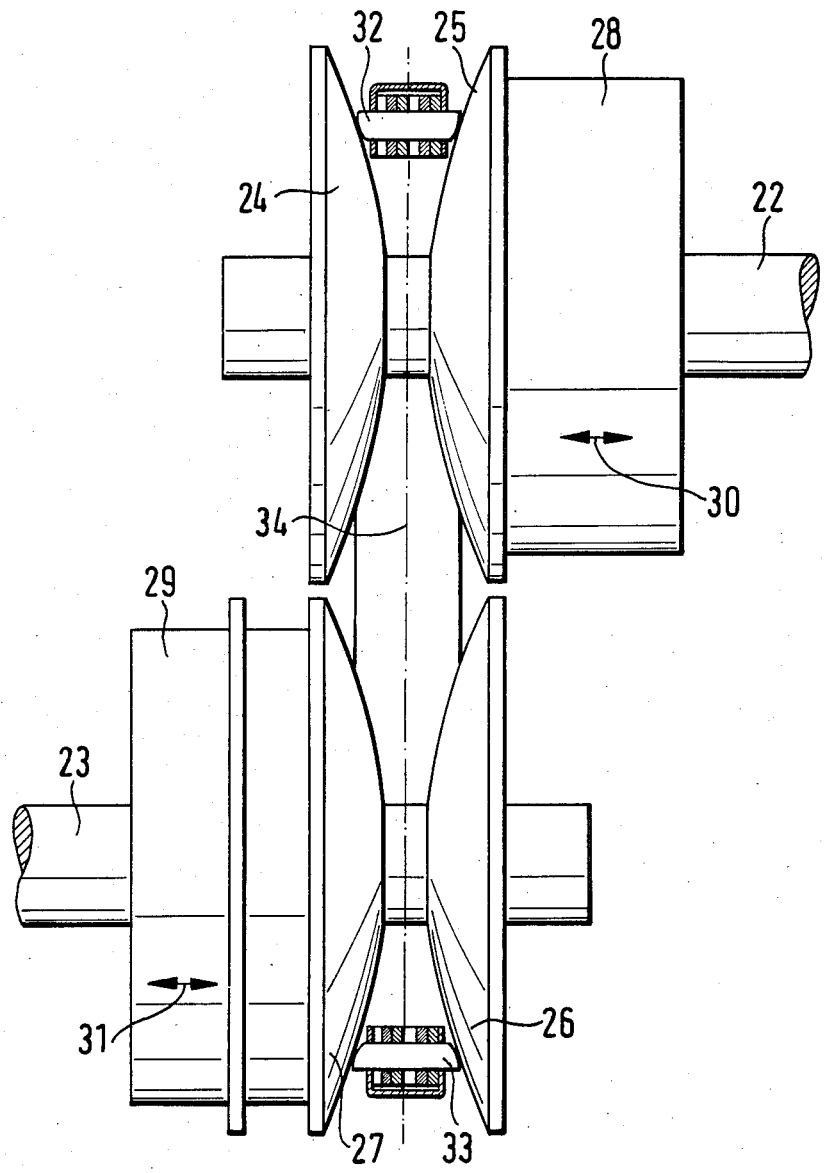
FIG. 2 is a detailed fractional view of the system of FIG. 1, illustrating spherical engagement faces and used in an explanation of the present invention.

FIG. 2 illustrates the engagement relationships between the chain and the cone disks in greater detail. Cone disk pairs 24 and 25 and 26, 27 are located on respective shafts 22, 23. The cone disks 24, 26 of the pairs are axially secured on the respective shafts 22, 23, whereas the cone disks 25, 27 are coupled to the cylinder-piston units 28, 29 which control axial shifting of the respective cone disks 25, 27 in accordance with the double arrows 30, 31 in axial direction. A steel link chain 34 is looped between the respective cone disk pairs 24, 25 and 26, 27. The position of the chain is illustrated in the 1:1 transmission ratio, that is, the speed of operation of the shafts 22, 23 will be equal. Compression elements 32, 33 contained on the chain are shown, since these elements will engage between the respective cone disks. The elements, in the position shown, are so located and the chain will be so positioned that a center line 34 through the chain will be in the center between the cone disks, and will extend transversely to the axes of the shafts 22, 23.

The cone disks are not formed with flat conical surfaces but, rather, with bulged or bowed surfaces, in the particular embodiment part-spherical surfaces, having a radius R—see FIGS. 4 and 5. The radii of all the disks will be equal, that is, all will have the radius R. The facing engagement surfaces of the compression elements 32, 33 will have a radius D (see FIGS. 4, 5).

Before considering the present invention, and for a clear understanding thereof, the relationship of the surface engagement between the compression elements and the cone disks, in accordance with the prior art, will first be explained. Referring to FIG. 3, which is a fragmentary schematic highly enlarged representation illustrating the frictional engagement pair between one compression element 35 and the surface of a cone disk 36. The cone disk 36 has a radius r, and the compression or engagement element on the chain link 35 has an outer surface radius d, which is measured from a center line extending transversely to the running direction of the chain. The radius r as is well known, is so selected that the tracking line 34 of the chain link looped about the disk pairs will be parallel to itself at all transmission ratio positions of the transmission, that is, at all times perpendicular to the axes of the shafts connecting the cone disks.

The surface engagement which results is illustrated by the contact positions 37, 38, 39. The different contact positions arise in different transmission ratios The contact position 38, in the center, is associated with a transmission ratio of 1:1, for example. In the illustration, if the link 35 is shifted downwardly in FIG. 3, that is, closer to the shaft of the cone disk 36, so that the link 35 will operate at a smaller radius of the disk 35, the engagement position will shift to that shown at 37. At a larger operating radius, the contact position 39 will result. As can be cleary seen, due to the spherical shape of the friction surface of the cone disks on the one hand and the also spherical shape of the engagement or compression elements on the other, high specific engagement force will be the result, causing high wear and tear on the engaging elements. Additionally, the contact positions 37, 38, 39 are comparatively close to each other. As the transmission ratio changes from 1:1 to other ratios, the wear on the compression element 35 will be concentrated narrowly around the central position 38. Material fatigue will arise at the facing surface of the compression elements in the range between the extremes of contact positions 37 and 39. Since this range is narrow, the compression element is highly stressed. In high torque transmissions, this is particularly difficult to control, since high compressive forces between the cone disks and the compression elements will result, which, as a consequence, results in extensive wear.

In accordance with the present invention, and to improve the arrangement, the geometric relationship of the contact positions is changed. FIG. 4 illustrates this relationship in a cone disk 40 with a compression element 41 of a chain (not further illustrated).

In accordance with the present invention, the radius R of the frictional surfaces of the cone disks 40—only one of which is illustrated—as well as the radius D of the contact surfaces of the link elements are substantially increased to such an extent that contact positions 42, 43, 44 (FIG. 5) result which are spread apart over the entire width of the link contact element 41. The illustration 45 shows the contact surfaces 42, 43, 44, with the end face rotated by 90° with respect to the engagement against the cone disk 40. The contact positions 42 to 44 are spread so far that, upon shifting of the transmission ratio between maximum and minimum, the distances of contact of the contact points are spaced, preferably throughout essentially the entire width of the link elements, so that, effectively, the entire contact surface of the link elements 41 will be used in operation of the transmission.

The arrangement insures that over the entire lifetime of the chain, the contact surfaces which are most subject to wear are still within the extreme limits of the link elements, that is, maintain a margin of safety or safety distance from the extreme limit, for example approximately in accordance with the relationship shown in FIG. 5. The system thus prevents engagement at the extreme edges. Slightly rounding the outer end region adjacent the contact points 42, 44, with a radius less than the radius D, insures that edge engagement is effectively prevented. The engagement pressure between facing cone disks of the cone disk pairs can be substantially less with the geometric relationships according to the present invention than with the prior art, while still permitting the transmission of higher energy, and specifically higher torque, with equal initial frictional relationships in systems of the present invention and of the prior art. Instability of frictional relationships is effectively avoided and the transmission ratio of the transmission can be changed even when the system is stopped, although the chain may be positioned between one of the pairs of the cone disks at a small radius thereof. A slight tracking offset will occur—that is, the center line of the chain will no longer be like the line 34 as shown in FIG. 2 but may be slightly canted which, however, in customarily used chains can be neglected. The canting will be slight.

I claim:

1. Infinitely variable cone disk transmission having two pairs of cone disks (24, 25; 26, 27), in which the cone disks of the pairs are formed with mutually facing engagement faces, which engagement faces are, at least approximately, part spherically curved about a curvature radius, and in a diagonal relationship one cone disk of the disks of each pair is axially shiftable, the other cone disk of the disks of the pair being fixed;

a transmission chain (9) looped between the cone disk pairs, having link elements formed with outwardly curved lateral contact surfaces, contacting the mutually facing engagement faces of the cone disks of the pairs, and transferring rotary power by frictional engagement with said faces, between the pairs of disks, wherein, in accordance with the invention, the radius of curvature R of the at least in part spherical engagement surfaces at any point of engagement with the curved contact surfaces of the chain link elements is greater than a theoretical radius of curvature r, which theoretical radius of curvature results when the distance of axial movement of the movable cone disk of one of the pairs is equal to the distance of axial movement of the movable cone disk of the other of the pairs upon change of transmission ratio—within the range of transmission ratios of the transmission-while maintaining torque transmitting engagement with the outwardly curved contact surfaces of the link elements; and wherein the radius D of curvature of the contact surfaces of the link elements is greater than half the width of the link elements, measured transversely to the running direction of the chain, when looped between said pairs of cone disks.

2. Transmission according to claim 1, wherein the engagement faces of the cone disks are spherical; and the contact surfaces of the link elements are spherical.

3. Transmission according to claim 1, wherein the radius R of the at least approximately part-spherical cone disks is between about 2 r to 4 r.

4. Transmission according to claim 2, wherein the radius R of the at least approximately part-spherical cone disks is between about 2 r to 4 r.

5. Transmission according to claim 1, wherein the radius of curvature D of the contact surfaces of the link elements is in the range of about 1/15 R to 1/25 R.

6. Transmission according to claim 1, wherein the radius of curvature D of the contact surfaces of the link elements is about 1/20 R.

7. Transmission according to claim 3, wherein the radius of curvature D of the contact surfaces of the link elements is in the range of about 1/15 R to 1/25 R.

8. Transmission according to claim 4, wherein the radius of curvature D of the contact surfaces of the link elements is in the range of about 1/15 R to 1/25 R.

9. Transmission according to claim 3, wherein the radius of curvature D of the contact surfaces of the link elements is in the range of about 1/20 R.

10. Transmission according to claim 4, wherein the radius of curvature D of the contact surfaces of the link elements is about 1/20 R.

* * * * *